(12) United States Patent
Lee et al.

(10) Patent No.: US 10,814,778 B2
(45) Date of Patent: Oct. 27, 2020

(54) APPARATUS AND METHOD FOR TRANSMITTING DRIVING INFORMATION RELATING TO SURROUNDING SITUATION OF VEHICLE

(71) Applicant: HYUNDAI MOBIS CO., LTD., Seoul (KR)

(72) Inventors: Eun Jeong Lee, Yongin-si (KR); Seung Woo Baek, Yongin-si (KR); Ban Suk Choi, Yongin-si (KR); Cheon Seop Shin, Yongin-si (KR); Jun Hyuk Cha, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/235,973

(22) Filed: Dec. 28, 2018

(65) Prior Publication Data

US 2020/0156536 A1 May 21, 2020

(30) Foreign Application Priority Data

Nov. 16, 2018 (KR) .......................... 10-2018-0141617

(51) Int. Cl.
*B60Q 1/50* (2006.01)
*B60Q 1/52* (2006.01)
*G06K 9/00* (2006.01)

(52) U.S. Cl.
CPC .............. *B60Q 1/503* (2013.01); *B60Q 1/525* (2013.01); *G06K 9/00805* (2013.01); *B60Q 2300/45* (2013.01)

(58) Field of Classification Search
USPC ........................................................ 340/468
See application file for complete search history.

(56) References Cited

U.S. PATENT DOCUMENTS 9,701,239 B2 * 7/2017 Kentley ................. B60N 2/002
9,766,454 B2 * 9/2017 Chau ................... G02B 27/0101
(Continued)

FOREIGN PATENT DOCUMENTS

EP          2993083 A1    3/2016
KR      10-1908308 B1   10/2018
WO       2017/180900 A1  10/2017

OTHER PUBLICATIONS

Extended European Search Report of corresponding Patent Application No. 18248155.6—11 pages. (dated Aug. 2, 2019).
(Continued)

*Primary Examiner* — Stephen R Burgdorf
(74) *Attorney, Agent, or Firm* — Knobbe Martens Olson & Bear LLP

(57) ABSTRACT

An apparatus for transmitting driving information of a vehicle may include: a surrounding information sensing unit configured to sense an obstacle positioned within a designated distance around the vehicle or an obstacle approaching within a designated distance; a vehicle information sensing unit configured to sense a status of the ego vehicle; a control unit configured to determine a surrounding situation of the ego vehicle or whether the surrounding situation was recognized, based on the information sensed through the surrounding information sensing unit, determine the status of the ego vehicle based on the information sensed through the vehicle information sensing unit, and output information through an information output unit, the information corresponding to the determined surrounding situation or whether the surrounding situation was recognized and the determined status of the ego vehicle; and the information output unit including a display lamp and speaker installed on the vehicle body.

15 Claims, 7 Drawing Sheets

(56) References Cited

U.S. PATENT DOCUMENTS

| | | | | |
|---|---|---|---|---|
| 9,784,839 B2* | 10/2017 | Graf | ............... | G01S 17/931 |
| 9,827,905 B1* | 11/2017 | Jones | ............... | B60Q 9/008 |
| 10,093,224 B2* | 10/2018 | Kim | ............... | B60Q 1/503 |
| 2010/0141418 A1 | 6/2010 | Feroldi | | |
| 2015/0194082 A1 | 7/2015 | McEwan | | |
| 2017/0085867 A1* | 3/2017 | Baran | ............... | B41M 3/008 |
| 2017/0229053 A1 | 8/2017 | Ishizuka et al. | | |
| 2017/0240098 A1 | 8/2017 | Sweeney et al. | | |
| 2018/0056851 A1* | 3/2018 | Kim | ............... | B60Q 1/085 |
| 2018/0082587 A1* | 3/2018 | Wan | ............... | B60W 50/14 |
| 2018/0174460 A1 | 6/2018 | Jung et al. | | |
| 2018/0297470 A1* | 10/2018 | Kim | ............... | B60K 35/00 |
| 2019/0126816 A1* | 5/2019 | Li | ............... | B60Q 1/525 |
| 2019/0213931 A1* | 7/2019 | Brubaker | ............... | B60Q 1/44 |
| 2019/0344713 A1* | 11/2019 | Kim | ............... | B60Q 1/50 |

OTHER PUBLICATIONS

Youtube Video "Covestro at K 2016: Automotive (English)", <https://www.youtube.com/watch?v=m5t5B9-Epa8> (published on Jan. 12, 2017).

* cited by examiner (a) Front (b) Side (c) Rear (a)

(b)

APPARATUS AND METHOD FOR TRANSMITTING DRIVING INFORMATION RELATING TO SURROUNDING SITUATION OF VEHICLE

CROSS-REFERENCES TO RELATED APPLICATIONS

The present application claims priority to Korean application number 10-2018-0141617, filed on Nov. 16, 2018, which is incorporated by reference in its entirety.

BACKGROUND OF THE INVENTION

The present invention relates to an apparatus and method for transmitting driving information of a vehicle, and more particularly, to an apparatus and method for transmitting driving information of a vehicle, which can transmit driving information of the ego vehicle or recognition on a pedestrian or another vehicle around the ego vehicle to the pedestrian or another vehicle through the vehicle body of the ego vehicle.

In general, a vehicle includes various sensors and electronic devices for users' convenience. In particular, research is being actively conducted on an ADAS (Advanced Driver Assistance System) for driving convenience. Furthermore, development for autonomous vehicles is being actively conducted.

Typically, a vehicle has various types of lamps installed therein.

For example, the vehicle includes various lamps having a lighting function (for example, headlamp) of enabling a driver to easily check an object around the vehicle in the night time and a signal function of informing another vehicle or other road users of the driving situation of the ego vehicle. Examples of the lamps may include a daytime running light (DRL), a position lamp, a turn signal light, a brake light and an emergency light. That is, the vehicle may include a device which operates by directly emitting light using a lamp such as a headlamp for irradiating light forward to secure a driver's view, a brake light turned on when the driver steps on the brake, or a turn signal light used during a right or left turn.

The DRL is automatically turned on when the vehicle is started, and automatically turned off when the headlamp is turned on.

In addition, the vehicle includes a reflector which is mounted at the front and rear thereof and reflects light such that the ego vehicle can be easily recognized from outside.

Recently, as the development for the ADAS and the autonomous vehicle is actively conducted, much attention is paid to a technology capable of maximizing the convenience and safety of users and the safety of pedestrians and drivers of other vehicles.

The related art of the present invention is disclosed in Korea Patent Registration No. 10-1908308 registered on Oct. 10, 2018 and entitled "Lamp for Vehicle".

SUMMARY OF THE INVENTION

Embodiments of the present invention are directed to an apparatus and method for transmitting driving information of a vehicle, which can transmit driving information of the ego vehicle or recognition on a pedestrian or another vehicle around the ego vehicle to the pedestrian or another vehicle through the vehicle body of the ego vehicle.

In one embodiment, an apparatus for transmitting driving information of a vehicle may include: a surrounding information sensing unit configured to sense an obstacle positioned within a designated distance around the vehicle or an obstacle approaching within a designated distance; a vehicle information sensing unit configured to sense a status of the ego vehicle; a control unit configured to determine a surrounding situation of the ego vehicle or whether the surrounding situation was recognized, based on the information sensed through the surrounding information sensing unit, determine the status of the ego vehicle based on the information sensed through the vehicle information sensing unit, and output information through an information output unit, the information corresponding to the determined surrounding situation of the ego vehicle or whether the surrounding situation was recognized and the determined status of the ego vehicle; and the information output unit including a display lamp and speaker installed on the vehicle body.

The surrounding information sensing unit may include one or more of a camera, an infrared sensor, a LiDAR (Light Detection and Ranging) and a laser sensor.

The obstacle may include one or more of a pedestrian, another vehicle and a two-wheeled vehicle.

The vehicle information sensing unit may sense one or more of drive/stop of the vehicle, an operation for changing a driving direction, a start-up of the vehicle, a brake operation, a turn signal light operation, the number and positions of passengers, and a steering wheel operation of a driver.

The control unit may output information to the information output unit installed on the vehicle body in a direction facing the obstacle, the information corresponding to the determined surrounding situation of the ego vehicle or whether the surrounding situation was recognized and the determined status of the ego vehicle.

The information output unit may be installed at one or more of the front, side, rear, top and bottom of the vehicle body.

The display lamp may perform an information output function as a display panel, while performing a function of a lighting lamp using a light emitting device.

The information output unit may be formed in a shape corresponding to an installation position on the vehicle body, and formed or installed in a shape corresponding to the exterior design of the vehicle.

The information output unit may perform a headlamp function, a DRL (Daytime Running Light) display function, a position display function, a direction indication function, a stop display function and an emergency display function, which are performed by an existing vehicle lamp, and perform the function of the existing vehicle lamp through a divided part of the display region while performing an information output function in a designated display style through the other divided part of the display region.

The designated information display style may include one or more of a text, image, pictogram, graphic and figure.

The information output unit may perform an information output function through a lighting pattern.

The information output unit may determine whether the current situation is an information transmission situation or a normal situation, and output a designated lighting pattern in case of the normal situation.

The information output unit may include an E-ink device, and perform blinking a designated number of times or more when outputting information through the E-ink device.

In another embodiment, a driving information transfer method for a vehicle may include: sensing, by a control unit, an obstacle positioned within a designated distance or an obstacle approaching within a designated distance through a surrounding information sensing unit; sensing, by the control unit, a status of the ego vehicle through a vehicle information sensing unit; determining, by the control unit, the status of the ego vehicle and a surrounding situation, based on the sensed information; setting, by the control unit, a display style and contents of information to be displayed, in response to the determined status of the ego vehicle and the determined surrounding situation; setting, by the control unit, a display direction or display position of the information to be displayed, in response to the determined status of the ego vehicle and the determined surrounding situation; and outputting, by the control unit, the information through an information output unit for a designated time, when the contents, display style and display direction or position of the information to be displayed are set in response to the status of the ego vehicle and the surrounding situation.

The display direction or position of the information may include one or more of the front, side, rear, top and bottom of the vehicle body, and corresponds to the direction or position where the obstacle is present.

The information output unit may be formed in a shape corresponding to an installation position on the vehicle body, and formed or installed in a shape corresponding to the exterior design of the vehicle.

The information output unit may perform a headlamp function, a DRL display function, a position display function, a direction indication function, a stop display function and an emergency display function, which are performed by an existing vehicle lamp, and perform the function of the existing vehicle lamp through a divided part of the display region while performing an information output function in a designated display style through the other divided part of the display region.

The information output unit may determine whether the current situation is an information transmission situation or a normal situation, and output a designated lighting pattern in case of the normal situation.

In accordance with an aspect, the apparatus and method can transmit the driving information of the ego vehicle or recognition information on a pedestrian or another vehicle around the ego vehicle to the pedestrian or another vehicle through the vehicle body of the ego vehicle.

In accordance with another aspect, the apparatus and method may output the driving information of the ego vehicle or the recognition information on a pedestrian or another vehicle through the vehicle body of the ego vehicle, thereby improving the convenience and safety of the user of the vehicle (or the autonomous vehicle) and the safety of the pedestrian and a driver of another vehicle.

In accordance with still another aspect, the apparatus and method may include the display lamp for transmitting the driving information of the ego vehicle or the recognition information on another vehicle to an ambient pedestrian or a driver of the another vehicle through the vehicle body, thereby improving the exterior quality and visibility.

DESCRIPTION OF SPECIFIC EMBODIMENTS

Figure 1:
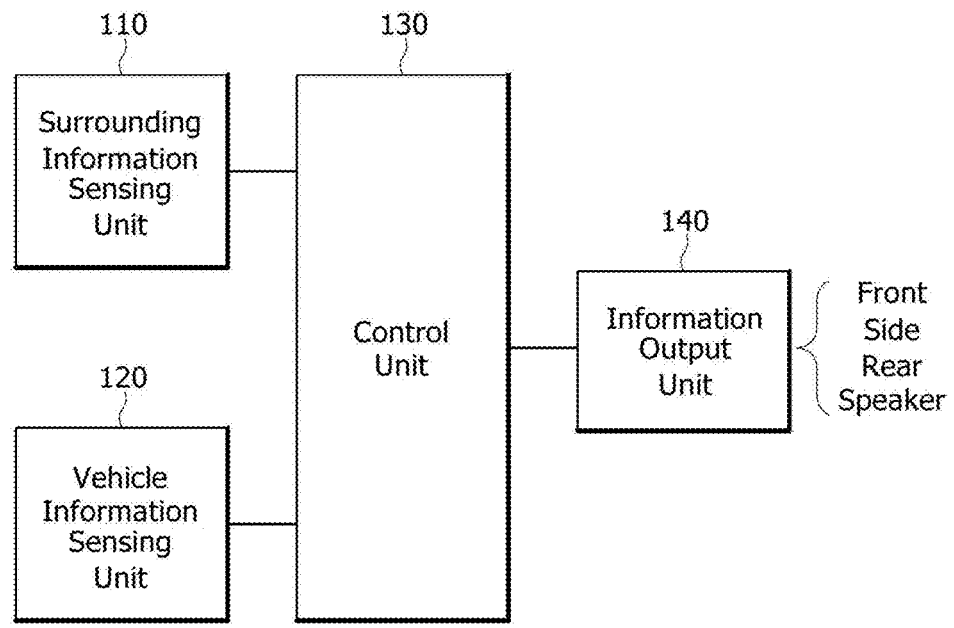
FIG. 1 illustrates a schematic configuration of an apparatus for transmitting driving information of a vehicle in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an apparatus and method for transmitting driving information of a vehicle in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 illustrates a schematic configuration of an apparatus for transmitting driving information of a vehicle in accordance with an embodiment of the present invention.

As illustrated in FIG. 1, the apparatus for transmitting driving information of a vehicle in accordance with the present embodiment may include a surrounding information sensing unit 110, a vehicle information sensing unit 120, a control unit 130 and an information output unit 140.

The surrounding information sensing unit 110 may sense a pedestrian or another vehicle around the ego vehicle.

For example, the surrounding information sensing unit 110 may sense an obstacle (for example, a pedestrian, another vehicle, two-wheeled vehicle or the like) positioned within a designated distance or approaching within a designated distance, using one or more sensors (for example, a camera, infrared sensor, LiDAR (Light Detection and Ranging), laser sensor and the like).

The vehicle information sensing unit 120 may sense the status of the ego vehicle.

For example, the vehicle information sensing unit 120 may sense an operation (or preliminary operation) for driving, stopping or turning the vehicle. Specifically, the vehicle information sensing unit 120 may sense a start-up of the vehicle (a power-on in the case of an electric vehicle), a brake operation, a turn signal light operation, the number and positions of passengers, and a wheel steering operation of a driver (for example, autonomous operation or manual operation).

The control unit 130 may determine the surrounding situations of the ego vehicle (or whether the surrounding situations are recognized), based on the various pieces of information sensed through the surrounding information sensing unit 110.

For example, the control unit 130 may determine whether an obstacle (for example, a pedestrian, another vehicle or two-wheeled vehicle) is around the ego vehicle or is approaching the ego vehicle.

The control unit 130 may determine the status (i.e. the current status) and the future status of the ego vehicle, based on the various pieces of information sensed through the vehicle information sensing unit 120. The future status may include information on whether the vehicle will make a turn, come to a stop, or make a start.

The control unit 130 may output the determined surrounding situations of the ego vehicle and the determined current and future status of the ego vehicle through the information output unit 140.

The information of the ego vehicle, outputted through the information output unit 140 by the control unit 130, may be used for helping an obstacle (for example, a pedestrian, another vehicle or two-wheeled vehicle) to recognize the current status and future status of the ego vehicle, the future status indicating the information on whether the vehicle will make a turn, come to a stop, or make a start. Therefore, the control unit 130 may output the information in such a direction that the obstacle can easily see the information, i.e. a direction facing the obstacle. The control unit 130 may output the information at the front of the ego vehicle body when the obstacle is in front, output the information at the right side of the ego vehicle body when the obstacle is on the right, and output the information at the rear of the ego vehicle body when the obstacle is in the back.

The information output unit 140 may include display lamps and speakers (sound output units) which are installed on the vehicle body (for example, front, side, rear, top and bottom).

The display lamp may perform an information output function as a display panel while performing a lighting lamp function using an LED device (for example, light emitting device). The information may include a text, image, pictogram or figure.

However, the information output unit 140, i.e. the display lamp, may be installed or formed in a different shape depending on the installation position on the vehicle body (for example, front, side or rear). That is, the information output unit 140 may be installed or formed in a shape corresponding to the exterior design (body design) of the vehicle.

FIGS. 2A to 2C are diagrams for describing the shape of the information output unit depending on the installation position in FIG. 1.

FIG. 2A illustrates the shape of the information output unit 140 installed at the front of the vehicle body, FIG. 2B illustrates the shape of the information output unit 140 installed at the side and top of the vehicle body, and FIG. 2C illustrates the shape of the information output unit 140 installed at the rear of the vehicle body.

At this time, the information output unit 140 installed on the vehicle body may simultaneously perform the function of an existing vehicle lamp (for example, a headlamp, DRL, position lamp, turn signal light, brake light or emergency light). That is, in the display lamp of the information output unit 140, a part of a display region (for example, a top line region) may function as the existing vehicle lamp such as a headlamp, DRL, position lamp, turn signal light, brake light or emergency light, and another part of the display region (for example, a bottom light pattern) may perform a function of outputting information such as a text, image, pictogram, graphic or figure.

Figure 2:
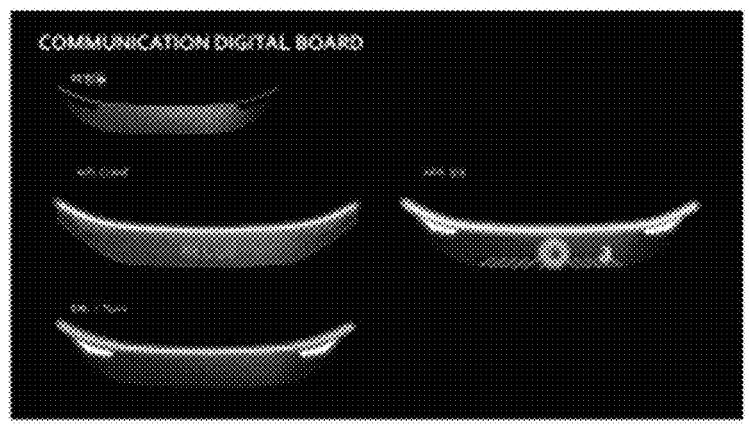
FIG. 2 shows diagrams for describing the shape of an information output unit in FIG. 1, depending on installation positions.
Figure 2:
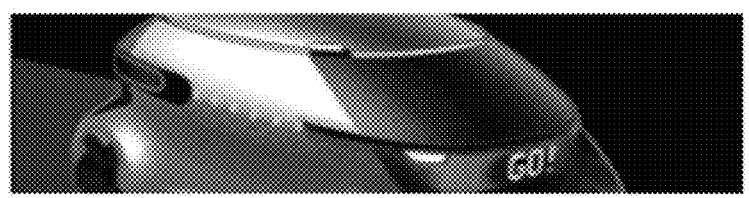
Figure 2:
Figure 5:
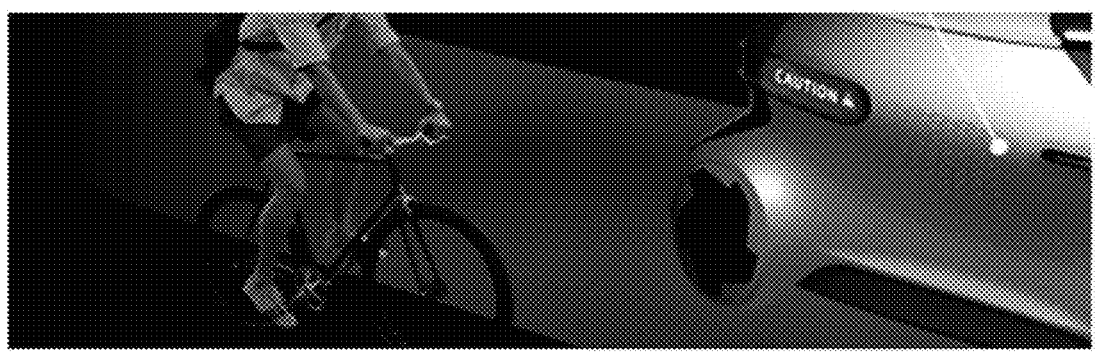
FIG. 5 illustrates the shapes of the information output units installed at the side and top of the vehicle body in FIG. 2 in more detail.
Figure 5:
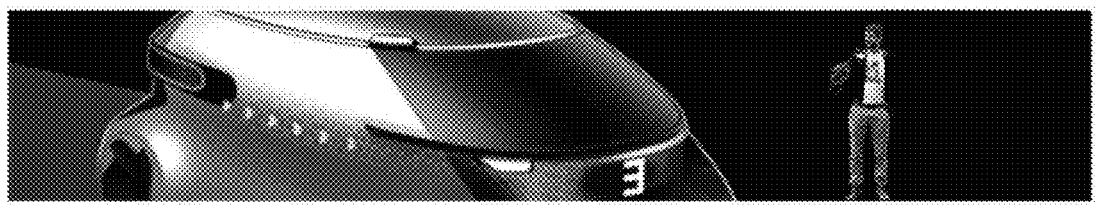
Figure 6:
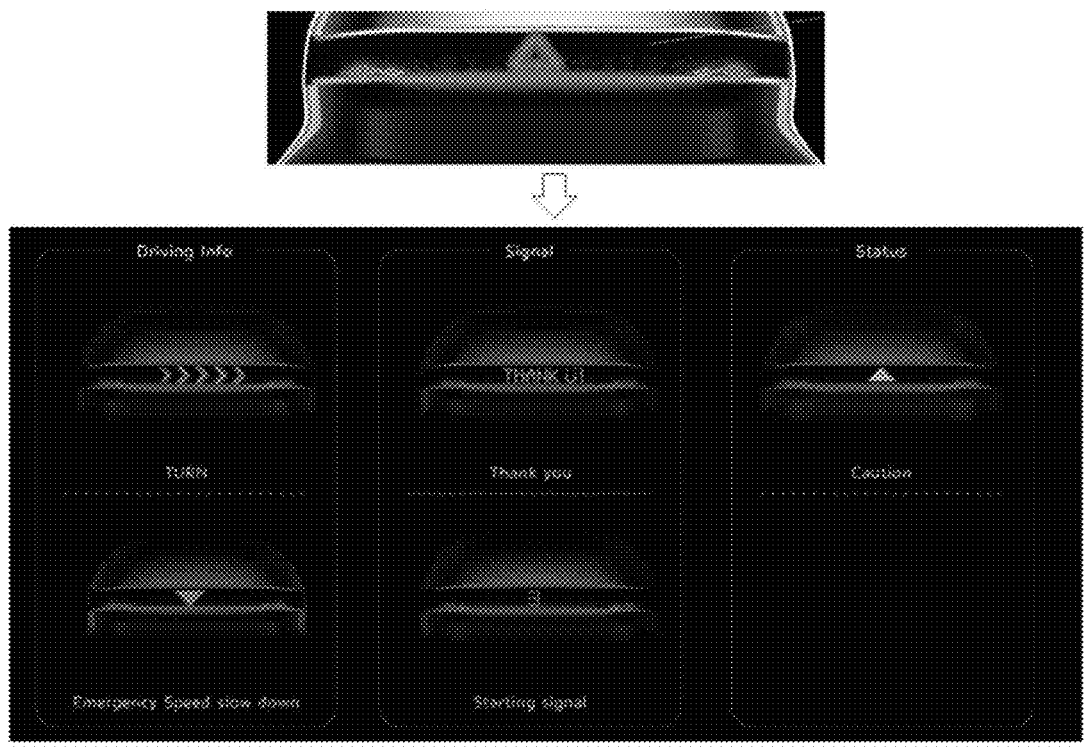
FIG. 6 illustrates the shape of the information output unit installed at the rear of the vehicle body in FIG. 2 in more detail.

FIGS. 3A and 3B and 4A to 4D illustrate the shape of the information output unit installed at the front of the vehicle body in FIG. 2 in more detail, FIGS. 5A and 5B illustrate the shapes of the information output units installed at the side and top of the vehicle body in FIG. 2 in more detail, and FIG. 6 illustrates the shape of the information output unit installed at the rear of the vehicle body in FIG. 2 in more detail.

Figure 3:
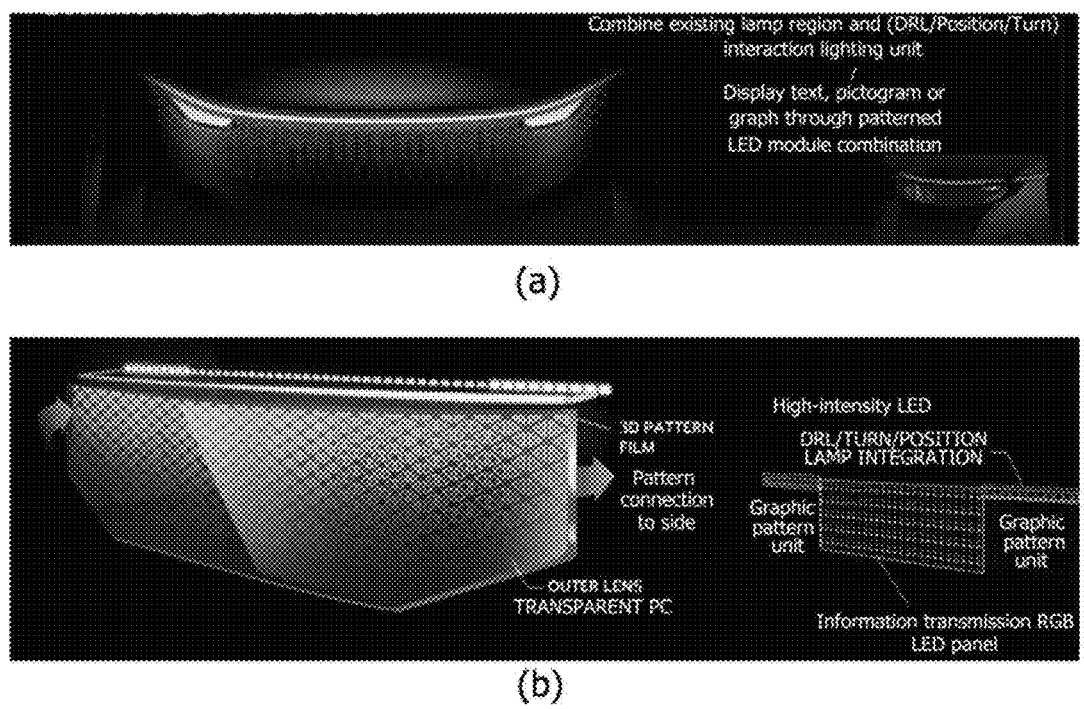
FIGS. 3 and 4 illustrate the shape of the information output unit installed at the front of a vehicle body in FIG. 2 in more detail.
Figure 4:
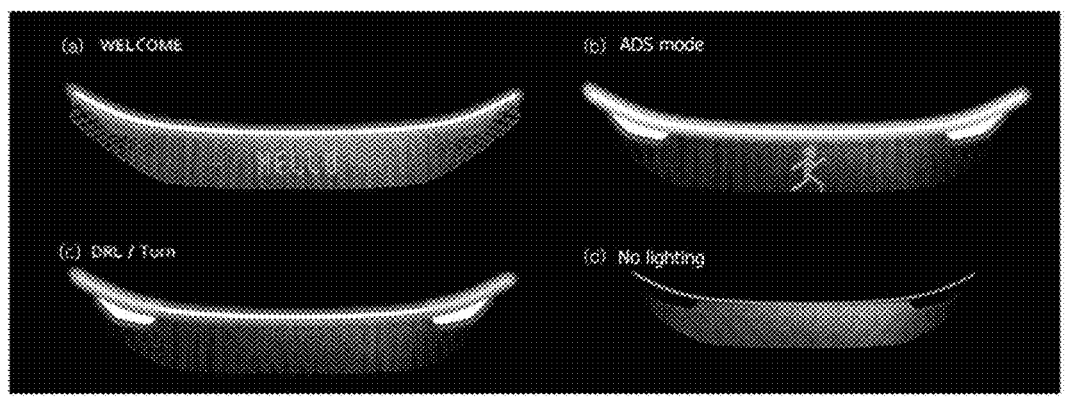

Referring to FIGS. 3A and 3B, the information output unit 140 installed at the front of the vehicle body may perform an information output function (or communication lighting function) through a lighting pattern, while performing a headlamp, DRL or position lamp function.

Referring to FIGS. 4A to 4D, the information output unit 140 may operate in different manners depending on whether it is an information transmission situation in which information needs to be transmitted or a normal situation. During the normal situation which is not the information transmission situation, the information output unit 140 may express information in a lighting pattern instead of an existing grille shape, thereby improving the exterior quality (aesthetic effect) of the vehicle.

For example, when the vehicle has the information transmission situation during autonomous driving, the bottom cell pattern region of the information output unit 140 may output information in a pictogram or text through cell combinations to which high-intensity RGB LEDs are applied, the top line region may display a different color depending on a welcome mode or automated driving system (ADS) mode, and the left and right regions LH and RH of the information output unit 140 may implement the DRL/position lamp/turn signal light function. Furthermore, during the normal situation, the information output unit 140 may drive the top line region by turning on the LEDs, and drive the bottom lighting pattern to emit light for beauty.

Referring to FIGS. 5A and 5B, when the ego vehicle (or the autonomous vehicle) is started, the control unit 130 may inform surrounding objects of the driving direction of the vehicle through the information output unit 140 in advance. Furthermore, when the ego vehicle is driving, the control unit 130 may display a lighting signal to surrounding objects, the lighting signal indicating that the ego vehicle recognized the surrounding objects.

For example, when the vehicle starts driving, the vehicle may perform blinking a designated number of times (for example, three times) or more at a predetermined time (for example, about two seconds) before the start of the driving, by displaying the driving direction (forward/reverse) as a directional pictogram (for example, E-ink or lighting) through the information output unit 140 installed at a side surface of the vehicle body.

That is, when a two-wheeled vehicle or pedestrian approaches a side surface of the ego vehicle (or the autonomous vehicle) during driving, the vehicle may display a lighting signal using a pictogram (for example, E-ink or lighting) through the information output unit 140 installed on the vehicle body in a direction corresponding to the position of the object (for example, the two-wheeled vehicle or pedestrian), the lighting signal indicating that the vehicle recognized the object.

Referring to FIG. 6, the control unit 130 may transmit information to an object at the rear of the vehicle (for example, a pedestrian or a driver of another vehicle) through the information output unit 140 installed at the rear of the vehicle body, the information including a direction, appreciation, caution, emergency, deceleration or start (for example, start after three seconds).

For example, the control unit 130 may display the information transmission region to overlap the position of the center lamp at the rear of the vehicle, such that communication contents (for example, appreciation, deceleration or start (for example, start after three seconds)) are simultaneously displayed in addition to the basic function of the rear lamp, which makes it possible to improve the convenience and stability of the user.

Therefore, the control unit 130 may divide the display region of the information output unit 140 installed at the rear of the vehicle body, such that a bottom line region is turned on to perform the basic function of the rear lamp (for example, direction indication, brake, stop or emergency), and a top display region, i.e. a region displayed as a lighting pattern, outputs information or communication contents to be transmitted to the rear through a designated information display method (for example, a text, image, pictogram, graphic or figure).

Figure 7:
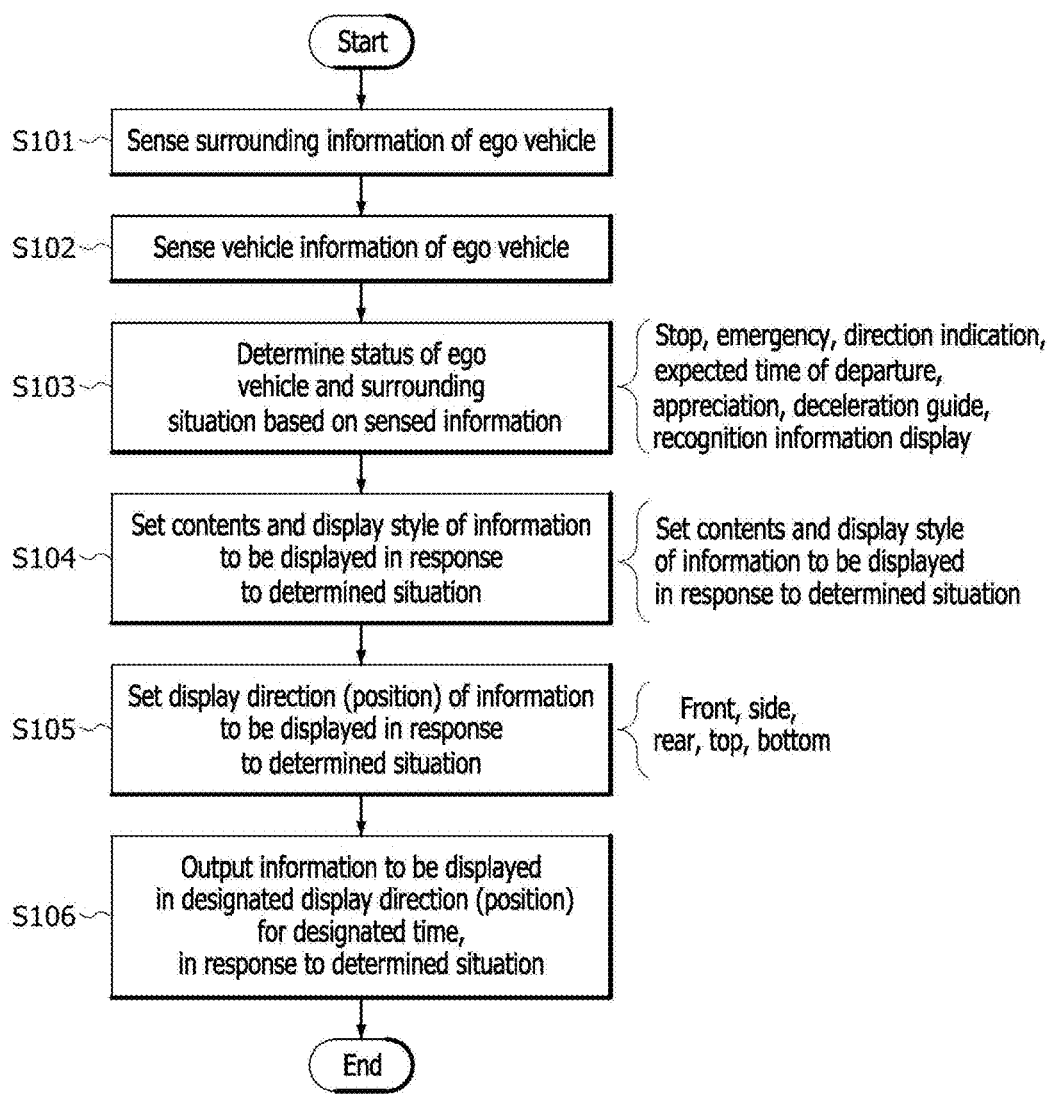
FIG. 7 is a flowchart for describing a method for transmitting driving information of a vehicle in accordance with an embodiment of the present invention.

FIG. 7 is a flowchart for describing a method for transmitting driving information of a vehicle in accordance with an embodiment of the present invention.

Referring to FIG. 7, the control unit 130 may sense an obstacle (for example, a pedestrian, another vehicle or two-wheeled vehicle) positioned within a designated distance or approaching within the designated distance through the surrounding information sensing unit 110 at step S101.

The control unit 130 may sense the status of the ego vehicle (for example, a start-up of the vehicle, power-on, brake operation, turn signal light operation, the number and positions of passengers, and a steering wheel operation of a driver) through the vehicle information sensing unit 120 at step S102.

The control unit 130 may determine the status of the ego vehicle and the surrounding situations (for example, stop, emergency, direction indication, a status to inform the driver of the expected time of departure, a status to display appreciation, a status to display deceleration, and a status to display another vehicle recognition information), based on the sensed information (that is, the information sensed through the surrounding information sensing unit or the vehicle information sensing unit) at step S103.

The control unit 130 may set the contents and display style (for example, text, image, pictogram, graphic or figure) of the information to be displayed, in response to the determined status of the ego vehicle and the determined surrounding situations (for example, stop, emergency, direction indication, a status to inform the driver of the expected time of departure, a status to display appreciation, a status to display deceleration, and a status to display another vehicle recognition information), at step S104.

The contents and display style (for example, text, image, pictogram, graphic or figure) of the information may be designated in advance.

The control unit 130 may set the display direction (position) of the information to be displayed, in response to the determined status of the ego vehicle and the determined surrounding situations (for example, stop, emergency, direction indication, a status to inform the driver of the expected time of departure, a status to display appreciation, a status to display deceleration, and a status to display another vehicle recognition information), at step S105.

For example, the display direction (position) of the information may be set to one or more of the front, side, rear, top and bottom of the vehicle body, and include the direction (position) where the obstacle (for example, a pedestrian, another vehicle or two-wheeled vehicle) is present.

When the contents, display style and direction (position) of the information to be displayed are set in response to the determined status of the ego vehicle and the determined surrounding situations (for example, stop, emergency, direction indication, a status to inform the driver of the expected time of departure, a status to display appreciation, a status to display deceleration, and a status to display another vehicle recognition information), the control unit 130 may output the information for a designated time, at step S106.

In accordance with the apparatus and method for transmitting driving information of a vehicle, the ego vehicle can transmit the driving information of the ego vehicle or recognition information on another vehicle to an ambient pedestrian or a driver of the another vehicle through the vehicle body, thereby improving the convenience and safety of the user of the vehicle (or the autonomous vehicle) and the safety of a pedestrian and a driver of another vehicle. In the present embodiment, the apparatus and method may include the display lamp for transmitting the driving information of the ego vehicle or the recognition information on another vehicle to an ambient pedestrian or a driver of the another vehicle through the vehicle body, thereby improving the exterior quality and visibility.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for transmitting driving information of a vehicle, comprising:
    a surrounding information sensing unit configured to sense an obstacle positioned within a designated distance around the vehicle or approaching within a designated distance;
    a vehicle information sensing unit configured to sense operation of the vehicle;
    a control unit configured to determine a surrounding situation of the vehicle or whether the surrounding situation was recognized, based on the obstacle sensed through the surrounding information sensing unit, determine a status of the vehicle based on the operation sensed through the vehicle information sensing unit, and output information through an information output unit, the information corresponding to the determined surrounding situation of the vehicle or whether the surrounding situation was recognized and the determined status of the vehicle; and the information output unit comprising a display lamp and speaker installed on an external portion of a body of the vehicle, wherein the information output unit is configured to perform a headlamp function, a Daytime Running Light (DRL) display function, a position display function, a direction indication function, a stop display function and an emergency display function, which are performed by an existing vehicle lamp, and perform the function of the existing vehicle lamp through a divided part of a display region while performing an information output function in a designated display style through another divided part of the display region, wherein the information output unit comprises an E-ink device, and performs blinking a designated number of times or more when outputting information through the E-ink device.

2. The apparatus of claim 1, wherein the surrounding information sensing unit comprises one or more of a camera, an infrared sensor, a LiDAR (Light Detection and Ranging) and a laser sensor.

3. The apparatus of claim 1, wherein the obstacle comprises one or more of a pedestrian, another vehicle and a two-wheeled vehicle.

4. The apparatus of claim 1, wherein the vehicle information sensing unit senses one or more of drive/stop of the vehicle, an operation for changing a driving direction, a start-up of the vehicle, a brake operation, a turn signal light operation, the number and positions of passengers, and a steering wheel operation of a driver.

5. The apparatus of claim 1, wherein the control unit outputs information to the information output unit installed on the vehicle body in a direction facing the obstacle, the information corresponding to the determined surrounding situation of the vehicle or whether the surrounding situation was recognized and the determined status of the vehicle.

6. The apparatus of claim 1, wherein the information output unit is installed at one or more of the front, side, rear, top and bottom of the body of the vehicle.

7. The apparatus of claim 1, wherein the display lamp performs an information output function as a display panel, while performing a function of a lighting lamp using a light emitting device.

8. The apparatus of claim 1, wherein the information output unit is formed in a shape corresponding to an installation position on the body of the vehicle, and formed or installed in a shape corresponding to exterior design of the vehicle.

9. The apparatus of claim 1, wherein the designated information display style comprises one or more of a text, image, pictogram, graphic and figure.

10. The apparatus of claim 1, wherein the information output unit performs an information output function through a lighting pattern.

11. The apparatus of claim 1, wherein the information output unit determines whether the current situation is an information transmission situation or a normal situation, and outputs a designated lighting pattern in case of the normal situation.

12. A method for transmitting driving information of a vehicle, comprising:
sensing, by a control unit, an obstacle positioned within a designated distance or approaching within a designated distance through a surrounding information sensing unit;
sensing, by the control unit, operation of the vehicle through a vehicle information sensing unit;
determining, by the control unit, a status of the vehicle and a surrounding situation, based on the sensed obstacle and the sensed operation of the vehicle;
setting, by the control unit, a display style and contents of information to be displayed, in response to the determined status of the vehicle and the determined surrounding situation;
setting, by the control unit, a display direction or display position of the information to be displayed, in response to the determined status of the vehicle and the determined surrounding situation; and
outputting, by the control unit, the information for a designated time through an information output unit installed on an external portion of a body of the vehicle, when the contents, display style and display direction or position of the information to be displayed are set in response to the status of the vehicle and the surrounding situation,
wherein the information output unit performs a headlamp function, a DRL display function, a position display function, a direction indication function, a stop display function and an emergency display function, which are performed by an existing vehicle lamp, and performs the function of the existing vehicle lamp through a divided part of a display region while performing an information output function in a designated display style through another divided part of the display region,
wherein the information output unit comprises an E-ink device, and performs blinking a designated number of times or more when outputting information through the E-ink device.

13. The method of claim 12, wherein the display direction or position of the information comprises one or more of the front, side, rear, top and bottom of the body of the vehicle, and corresponds to the direction or position where the obstacle is present.

14. The method of claim 12, wherein the information output unit is formed in a shape corresponding to an installation position on the body of the vehicle, and formed or installed in a shape corresponding to exterior design of the vehicle.

15. The method of claim 12, wherein the information output unit determines whether the current situation is an information transmission situation or a normal situation, and outputs a designated lighting pattern in case of the normal situation.

* * * * *